United States Patent [19]

Lin

[11] Patent Number: 6,079,474

[45] Date of Patent: Jun. 27, 2000

[54] SUN-SHADE ASSEMBLY

[76] Inventor: Yung-Ching Lin, No. 8, Lane 762, Chungshan N. Rd., Yungkang City, Tainan Hsien, Taiwan

[21] Appl. No.: 09/369,793

[22] Filed: Aug. 6, 1999

[51] Int. Cl.$^7$ ....................................................... B60J 1/20
[52] U.S. Cl. ..................................... 160/370.22; 160/262
[58] Field of Search ............................. 160/262, 370.22, 160/318; 296/97.8, 141, 143

[56] References Cited

U.S. PATENT DOCUMENTS

| | | | |
|---|---|---|---|
| 516,018 | 3/1894 | Lauer | 160/262 |
| 3,069,198 | 12/1962 | Winn | 160/262 X |
| 3,075,805 | 1/1963 | Golde et al. | 160/262 X |
| 5,036,898 | 8/1991 | Chen | 160/370.22 X |
| 5,054,533 | 10/1991 | Lii | 160/370.22 X |
| 5,344,206 | 9/1994 | Middleton | 160/370.22 X |
| 5,813,449 | 9/1998 | Patmore et al. | 160/370.22 |

FOREIGN PATENT DOCUMENTS

| | | | |
|---|---|---|---|
| 3935984 | 5/1991 | Germany | 160/370.22 |
| 2416 of 1854 | | United Kingdom | 160/262 |

*Primary Examiner*—Jerry Redman
*Attorney, Agent, or Firm*—Trop, Pruner & Hu, P.C.

[57] ABSTRACT

A sun-shade assembly includes a stationary curved shaft, a tubular roller, a screen, and a torsion spring. The roller is made of a resilient material, and is sleeved rotatably around the shaft. The roller has a curvature conforming with that of the shaft. The screen is wound around the roller, and has a lower edge connected to the roller and an upper edge provided with a stretch rod which has a curvature conforming with that of the shaft. The torsion spring has a first end secured to the roller, and an opposite second end secured to the shaft. The screen is unwound from the roller when the stretch rod is pulled away from the roller, thereby resulting in rotation of the roller about the shaft in a first direction against biasing force of the torsion spring. The torsion spring biases the roller to rotate about the shaft in a second direction opposite to the first direction to result in winding of the screen onto the roller.

10 Claims, 5 Drawing Sheets

SUN-SHADE ASSEMBLY

BACKGROUND OF THE INVENTION

1. Field of the Invention

This invention relates to a sun-shade assembly, more particularly to a sun-shade assembly having a screen that is capable of providing a curved shading surface.

2. Description of the Related Art

A sun-shade device is commonly installed in an automobile adjacent to a window for shading the interior of the automobile. A conventional sun-shade device generally includes an elongated housing and a screen mounted on the housing and stretchable from the housing. The screen generally extends along a flat plane when stretched. However, when this kind of sun-shade device is used in an automobile having a curved window, the shape of the screen when stretched does not conform with the curved window, and cannot provide a satisfactory sun-shading effect.

SUMMARY OF THE INVENTION

Therefore, the main object of the present invention is to provide a sun-shade assembly having a screen that is capable of providing a curved shading surface.

Accordingly, the sun-shade assembly of the present invention includes a stationary curved shaft, a tubular roller, a screen, and a torsion spring. The roller is made of a resilient material, and is sleeved rotatably around the shaft. The roller has a curvature conforming with that of the shaft. The screen is wound around the roller, and has a lower edge connected to the roller and an upper edge provided with a stretch rod which has a curvature conforming with that of the shaft. The torsion spring has a first end secured to the roller, and an opposite second end secured to the shaft. The screen is unwound from the roller when the stretch rod is pulled away from the roller, thereby resulting in rotation of the roller about the shaft in a first direction against biasing force of the torsion spring. The torsion spring biases the roller to rotate about the shaft in a second direction opposite to the first direction to result in winding of the screen onto the roller.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
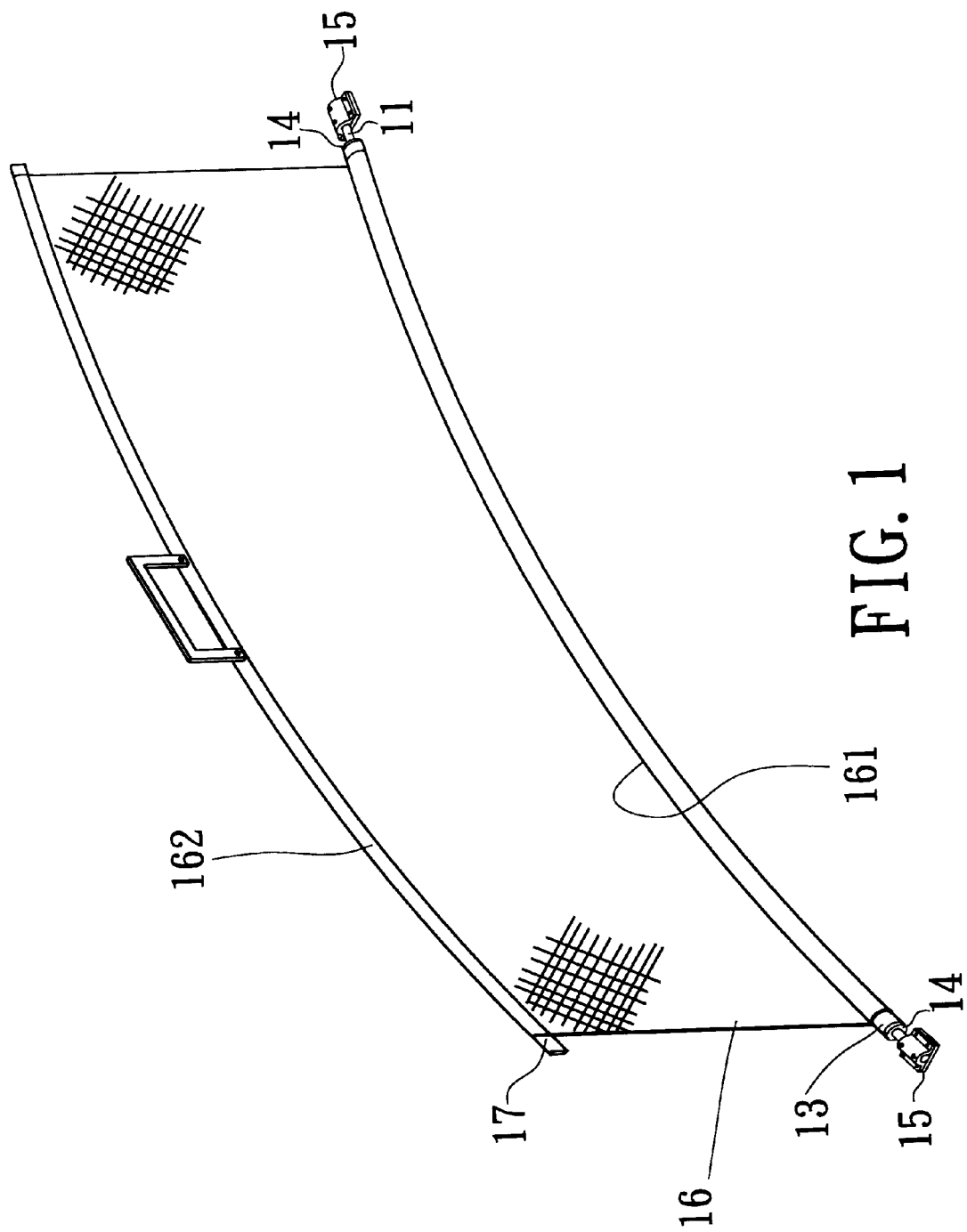
FIG. 1 is a perspective view of a preferred embodiment of a sun-shade assembly according to the present invention.
Figure 2:
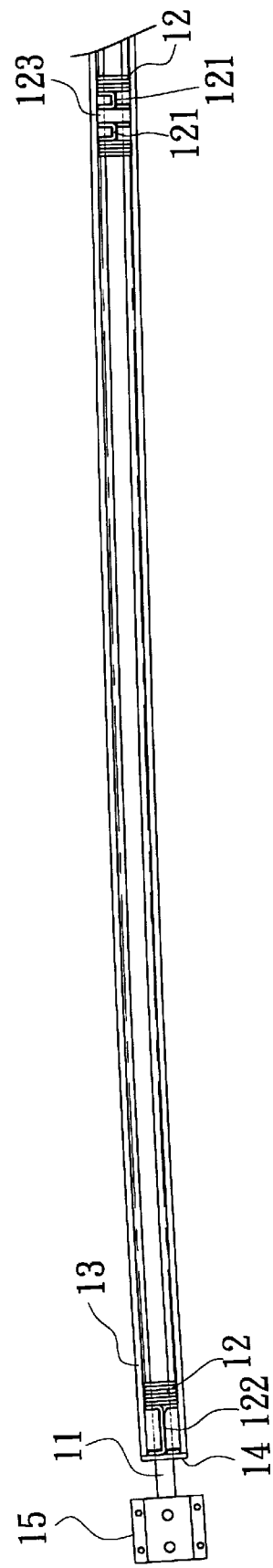
FIG. 2 is a fragmentary cross-sectional top view of the preferred embodiment.

Referring to FIGS. 1 and 2, the preferred embodiment of a sun-shade assembly according to the present invention is shown to include a stationary curved shaft 11, a tubular roller 13 sleeved on the shaft 11, a screen 16 wound around the roller 13, and a pair of torsion springs 12.

Figure 3:
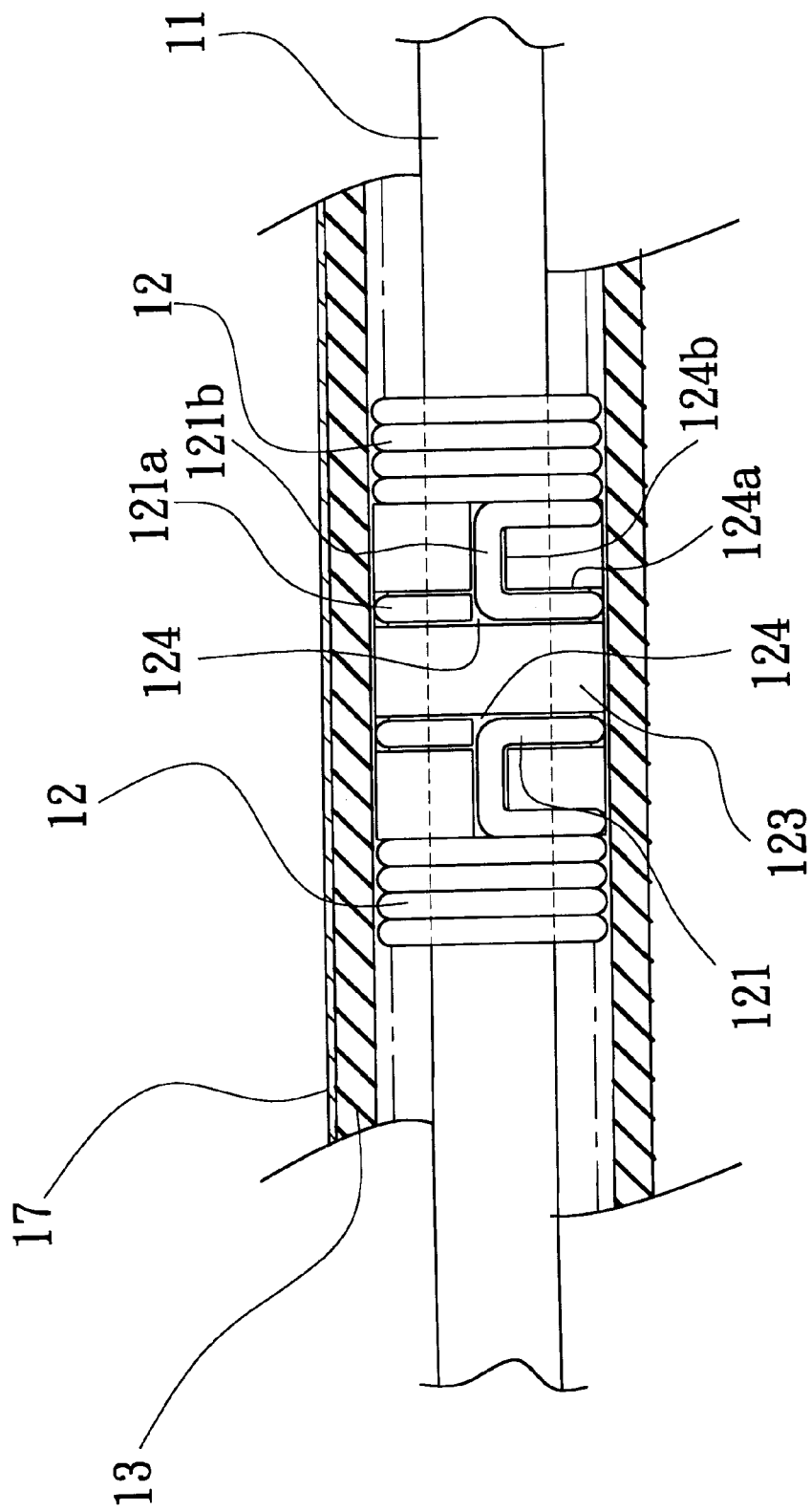
FIG. 3 is an enlarged cross-sectional view of the preferred embodiment.

Referring to FIGS. 2 and 3, the shaft 11 is made of a metal material, and is bent to have a predetermined curvature about a vertical axis so as to conform with the curvature of a window of an automobile to which the sun-shade assembly is to be applied. The shaft 11 has two opposite end portions, each of which is fastened to a mounting seat 15. The mounting seat 15 will be described later herein. A positioning sleeve 123 is sleeved securely on the shaft 11 in an intermediate section of the latter. The positioning sleeve 123 has an outer wall surface formed with a pair of positioning grooves 124 which are adjacent to two opposite ends of the positioning sleeve 123, respectively. Each of the positioning grooves 124 has a circumferentially extending groove portion 124a which extends around the positioning sleeve 123, and an axially extending groove portion 124b which extends from the circumferentially extending groove portion 124a to an adjacent end of the positioning sleeve 123.

The roller 13 is made of a resilient material, and is sleeved rotatably around the shaft 11 between the end portions of the shaft 11. The roller 13 can thus bend to possess a curvature conforming with that of the shaft 11.

Figure 4:
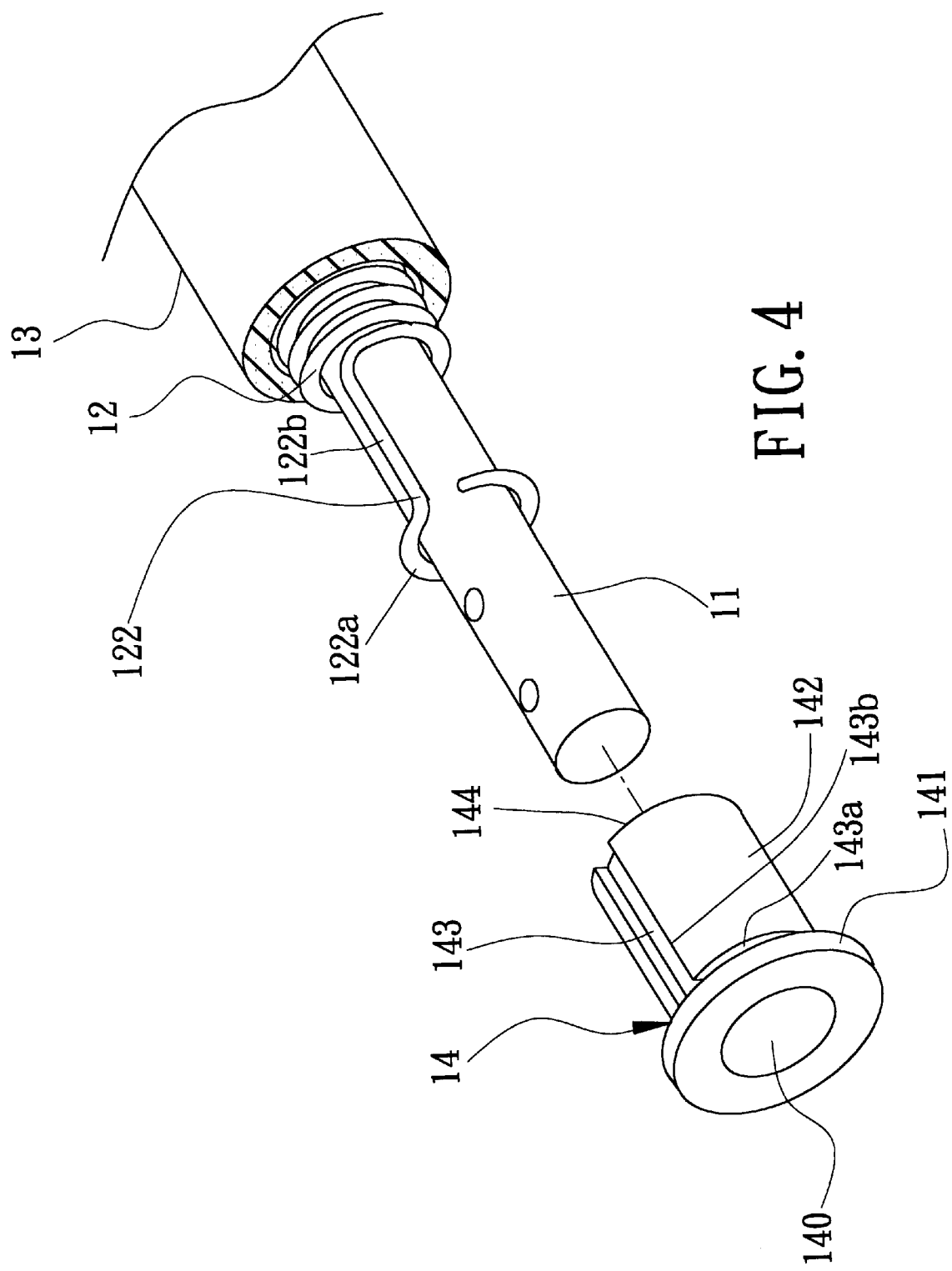
FIG. 4 is a fragmentary exploded sectional view of the preferred embodiment.

A pair of retaining sleeves 14 (only one is shown in FIG. 2) are provided on two opposite ends of the roller 13. Referring to FIGS. 2 and 4, each of the retaining sleeves 14 has an outer end formed with a radially extending annular rim 141, a sleeve portion 142 extending from the annular rim 141, and an axial hole 140 formed through the annular rim 141 and the sleeve portion 142 to permit extension of a respective one of the end portions of the shaft 11 therethrough. Each of the retaining sleeves 14 is inserted into the roller 13 at a respective end of the latter. The sleeve portion 142 of each of the retaining sleeves 14 engages fittingly an inner surface of the roller 13 so as to be connected securely to and be co-rotatable with the roller 13. The annular rim 141 of each of the retaining sleeves 14 has an outer periphery with a diameter larger than that of the sleeve portion 142, and abuts against an end face of the respective end of the roller 13. The axial hole 140 of each of the retaining sleeves 14 is larger than the cross-section of the shaft 11 such that the retaining sleeves 14 are rotatable relative to the shaft 11. The sleeve portion 142 of each of the retaining sleeves 14 is formed with a retaining groove 143 which includes a circumferentially extending groove portion 143a that extends around the sleeve portion 142 and that is proximate to the annular rim 141, and an axially extending groove portion 143b that extends from the circumferentially extending groove portion 143a to an inner end 144 of the retaining sleeve 14.

The torsion springs 12 are sleeved on the shaft 11 on opposite sides of the positioning sleeve 123. Each of the torsion springs 12 extends between the positioning sleeve 123 and a respective one of the retaining sleeves 14. Each of the torsion springs 12 has an outer first end 122 formed with a leg which extends into the retaining groove 143 in the sleeve portion 142 of the respective one of the retaining sleeves 14. The leg of the first end 122 has a ring section 122a received in the circumferentially extending groove portion 143a of the retaining groove 143, and a linear section 122b received in the axially extending groove portion 143b so as to connect securely the first end 122 of the torsion spring 12 to the respective retaining sleeve 14, and thus to the roller 13. Each of the torsion springs 12 further has an inner second end 121 formed with a leg which extends into an adjacent one of the positioning grooves 124 in the positioning sleeve 123. Referring to FIG. 3, the leg of the second end 121 of each of the torsion springs 12 also has a ring section 121a received in the circumferentially extending groove portion 124a of the respective positioning groove 124, and a linear section 121b received in the axially extending groove portion 124b of the respective positioning groove 124 so as to connect securely the second end 121 of the torsion spring 12 to the positioning sleeve 123, and thus to the shaft 11.

Figure 5:
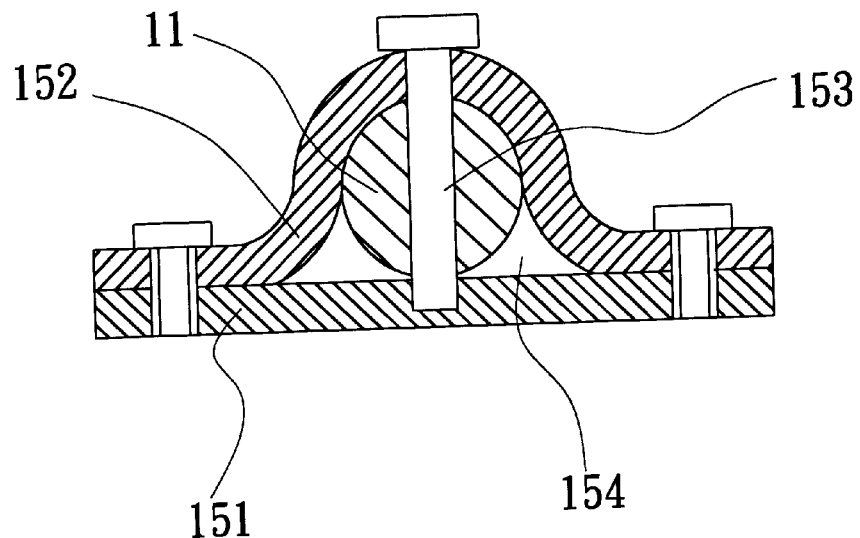
FIG. 5 is a sectional view showing a mounting seat of the preferred embodiment.

Referring to FIGS. 1 and 5, each of the mounting seats 15 includes a base portion 151, a top portion 152 disposed on the base portion 151 and cooperating with the base portion 151 to confine a mounting space 154 therebetween to permit extension of a respective one of the end portions of the shaft 11 thereinto, and fastening pins 153 which extend through the top portion 152 and the shaft 11 and into the base portion 151 for fastening the respective end portion of the shaft 11 onto the mounting seat 15. The mounting seats 15 are adapted to be mounted in an automobile (not shown), such as on a platform adjacent to a window of the automobile, for installing the sun-shade assembly to the automobile.

The screen 16 is wound around the roller 13, and has a lower edge 161 connected to the roller 13. The screen 16 is preferably made of a sheet of elastic cloth to prevent wrinkling thereof when wound around the roller 13. The screen 16 further has an upper edge 162 provided with a stretch rod 17 which has a curvature conforming with that of the shaft 11. A handle member 171 is mounted on the stretch rod 17 to facilitate stretching of the screen 12 from the roller 13. The handle member 171 can be hooked at a hanger provided in the automobile for retaining the screen 16 at the stretched state.

Referring to FIGS. 1 and 2, to use the sun-shade assembly, the stretch rod 17 is pulled away from the roller 13 to unwind the screen 16 from the roller 13 and to cause rotation of the roller 13 in a first direction relative to the shaft 11. The unwound screen 16 thus provides a curved shading surface with a curvature conforming with that of the shaft 11. The retaining sleeves 14 rotate together with the roller 13 with respect to the shaft 11. As the first ends 122 of the torsion springs 12 are connected securely to the retaining sleeves 14, rotation of the retaining sleeves 14 enables the torsion springs 12 to store a restoring energy. When the pulling force applied on the stretch rod 17 is released, the restoring energy stored in the torsion springs 12 causes the roller 13 to rotate in a second direction opposite to the first direction, thereby winding the screen 16 on the roller 13.

Figure 6:
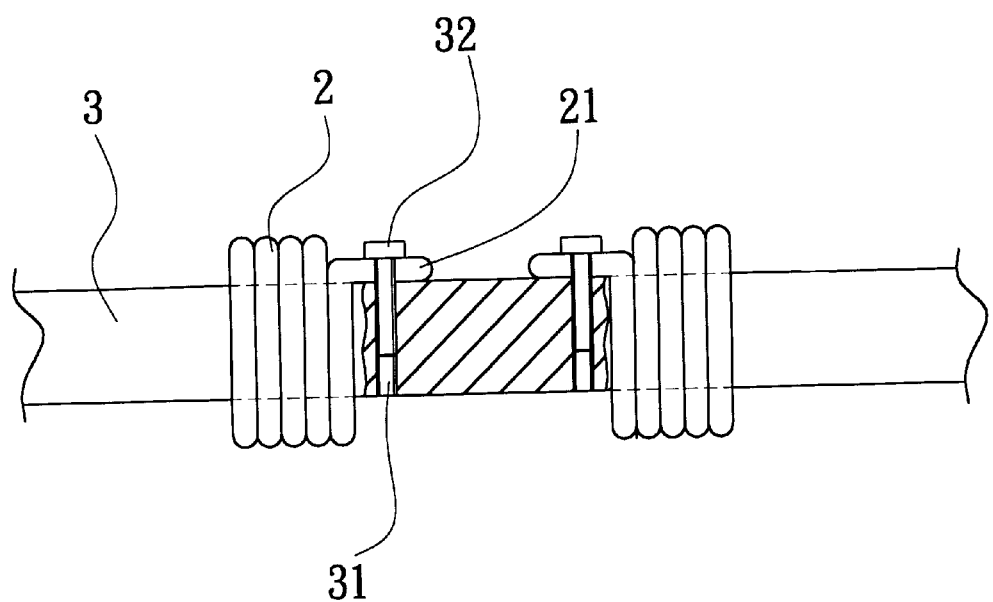
FIG. 6 is a fragmentary view showing how a pair of torsion springs are connected to a shaft in another preferred embodiment according to the present invention.

Referring to FIG. 6, another preferred embodiment of a sun-shade assembly according to the present invention has a structure similar to that of the previous embodiment, except that the inner second end 21 of each of the torsion springs 2 is fastened directly to the shaft 3 by means of a screw fastener 32 which extends threadedly into a radial screw hole 31 formed in the shaft 3.

It has been shown that, in the sun-shade assembly according to the present invention, by winding the screen 16 on the resilient tubular roller 13 which is sleeved rotatably around the stationary curved shaft 11, the screen 16 can be stretched to provided a curved shading surface to conform with the shape of a curved window.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A sun-shade assembly comprising:

a stationary curved shaft;

a tubular roller made of a resilient material, said roller being sleeved rotatably around said shaft, and having a curvature conforming with that of said shaft;

a screen wound around said roller, said screen having a lower edge connected to said roller and an upper edge provided with a stretch rod which has a curvature conforming with that of said shaft;

a torsion spring having a first end secured to said roller, and an opposite second end secured to said shaft;

said screen being unwound from said roller when said stretch rod is pulled away from said roller, thereby resulting in rotation of said roller about said shaft in a first direction against biasing force of said torsion spring, said torsion spring biasing said roller to rotate about said shaft in a second direction opposite to the first direction to result in winding of said screen onto said roller; and a retaining sleeve which is sleeved rotatable on said shaft and which extends into said roller, said retaining sleeve being mounted on said roller so as to be co-rotatable therewith, said retaining sleeve having an outer wall surface formed with a retaining groove, said first end of said torsion spring being received in said retaining groove for connecting securely to said retaining sleeve, said retaining groove including a circumferentially extending groove portion and an axially extending groove portion extending from said circumferential grove portion, said first end of said torsion spring including a ring section received in said circumferential groove portion, and a linear section which extends from said ring section and which is received in said axially extending groove portion.

2. The sun-shade assembly according to claim 1, wherein said retaining sleeve has an inner end that extends fittingly into said roller, and an outer end that is formed with a radially extending annular rim which abuts against an end face of said roller, said circumferentially extending groove portion being disposed adjacent to said annular rim, said axially extending groove portion extending from said circumferentially extending groove portion to said inner end of said retaining sleeve.

3. The sun-shade assembly according to claim 1, further comprising a positioning sleeve which is sleeved securely on said shaft and which has an outer wall surface formed with a positioning groove, said second end of said torsion spring being received in said positioning groove for connecting securely to said positioning sleeve.

4. The sun-shade assembly according to claim 1, wherein said shaft is formed with a radial screw hole, said sun-shade assembly further comprising a screw fastener for fastening said second end of said torsion spring on said shaft at said screw hole.

5. The sun-shade assembly according to claim 1, wherein said screen is made of an elastic material.

6. The sun-shade assembly according to claim 1, further comprising a handle member mounted on said stretch rod to facilitate pulling of said stretch rod away from said roller.

7. The sun-shade assembly according to claim 1, wherein said shaft has two opposite end portions projecting from said roller, said sun-shade assembly further comprising a pair of mounting seats, each of said mounting seats including a base portion, a top portion disposed on said base portion and cooperating with said base portion to confine a mounting space which permits extension of a respective one of said end portions of said shaft thereinto, and a fastening pin extending through said top portion and said shaft and into said base portion for fastening the respective one of said end portions of said shaft on said mounting seat.

8. The sun-shade assembly according to claim 1, wherein said shaft is curved about a vertical axis.

9. A sun-shade assembly comprising:

a stationary curved shaft formed with a radial screw hole;

a tubular roller made of a resilient material, said roller being sleeved rotatably around said shaft, and having a curvature conforming with that of said shaft;

a screen wound around said roller, said screen having a lower edge connected to said roller and an upper edge provided with a stretch rod which has a curvature conforming with that of said shaft;

a torsion spring having a first end secured to said roller, and an opposite second end secured to said shaft;

said screen being unwound from said roller when said stretch rod is pulled away from said roller, thereby resulting in rotation of said roller about said shaft in a first direction against biasing force of said torsion spring, said torsion spring biasing said roller to rotate about said shaft in a second direction opposite to the first direction to result in winding of said screen onto said roller; and screw fastener for fastening said second end of said torsion spring on said shaft at said screw hole.

10. A sun-shade assembly comprising:

a stationary curved shaft;

a tubular roller made of a resilient material, said roller being sleeved rotatably around said shaft, and having a curvature conforming with that of said shaft, said shaft having two opposite end portions projecting from said roller;

a screen wound around said roller, said screen having a lower edge connected to said roller and an upper edge provided with a stretch rod which has a curvature conforming with that of said shaft;

a torsion spring having a first end secured to said roller, and an opposite second end secured to said shaft;

said screen being unwound from said roller when said stretch rod is pulled away from said roller, thereby resulting in rotation of said roller about said shaft in a first direction against biasing force of said torsion spring, said torsion spring biasing said roller to rotate about said shaft in a second direction opposite to the first direction to result in winding of said screen onto said roller;

a pair of mounting seats, each of said mounting seats including a base portion, a top portion disposed on said base portion and cooperating with said base portion and cooperating with said base portion to confine a mounting space which permits extension of a respective one of said end portions of said shaft thereinto; and a fastening pin extending through said top portion and said shaft and into said base portion for fastening the respective one of said end portions of said shaft on said mounting seat.

* * * * *